US008792714B2

(12) United States Patent  
Geva et al.

(10) Patent No.: US 8,792,714 B2  
(45) Date of Patent: Jul. 29, 2014

(54) DETECTING ANTI-ALIASED TEXT IN DIGITAL IMAGES

(75) Inventors: Amir Geva, Yokneam (IL); Sivan Gleichman, Haifa (IL); Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 13/235,385

(22) Filed: Sep. 18, 2011

(65) Prior Publication Data

US 2013/0071017 A1    Mar. 21, 2013

(51) Int. Cl.
    *G06K 9/00*     (2006.01)
    *G06K 9/46*     (2006.01)
    *G06K 9/66*     (2006.01)
    *G06K 9/48*     (2006.01)

(52) U.S. Cl.
    USPC ............ 382/170; 382/165; 382/192; 382/199

(58) Field of Classification Search
    None
    See application file for complete search history.

(56) References Cited

U.S. PATENT DOCUMENTS

| 6,243,499 | B1 | 6/2001 | Loce et al. |
| 7,587,084 | B1 | 9/2009 | O'Neill et al. |
| 2003/0058474 | A1* | 3/2003 | Loce et al. ............ 358/2.1 |
| 2007/0146386 | A1* | 6/2007 | Loce et al. ............ 345/611 |

OTHER PUBLICATIONS

Keechul Jung, et al., "Text information extraction in images and video: a survey," Pattern Recognition, vol. 37, No. 5, pp. 977-997, 2004.

Zoltan Hawryluk, "How to Detect Font-Smoothing Using JavaScript", Blog, 'User Agent Man', Nov. 29, 2009, Publisher: Zoltan Hawryluk.

Einsele, et al., "Towards identification of very low resolution, antialaised characters", 9th International Symposium on Signal Processing and Its Applications, 2007. ISSPA 2007. Publisher: IEEE.

Gleichman et al., "Detection and Segmentation of Antialiased Text in Screen Images", 2011 International Conference on Document Analysis and Recognition (ICDAR), pp. 424-428, Sep. 18-21, 2011.

* cited by examiner

*Primary Examiner* — Bernard Krasnic

(57) ABSTRACT

A method, including automatically identifying, by a processor, a region of a digital image containing first pixels, each situated on a positive horizontal gradient, and second pixels in proximity to the first pixels, each situated on a negative horizontal gradient. A distribution of intensities of a color channel is then calculated for the pixels in the region, and the distribution is analyzed in order to detect whether the region contains anti-aliased text.

15 Claims, 3 Drawing Sheets

DETECTING ANTI-ALIASED TEXT IN DIGITAL IMAGES

FIELD OF THE INVENTION

This invention relates generally to digital image processing, and specifically to detecting regions containing anti-aliased text within a digital image.

BACKGROUND OF THE INVENTION

In computer graphics, "jaggies" refer to step-like lines that appear (e.g., in aliased text) where there should be smooth straight lines or curves. Jaggies typically occur because an output device (e.g., a monitor), does not have sufficient resolution to represent a smooth line.

Anti-aliasing is a commonly used technique to reduce jaggies, thereby enabling a computer system to present text (i.e., anti-aliased text) with smooth contours that better emulate the appearance of text produced by conventional ink-and-paper printing. Anti-aliasing reduces the prominence of jaggies by surrounding the step-like lines with intermediate shades of gray (for gray-scaling devices) or color (for color devices).

SUMMARY OF THE INVENTION

There is provided, in accordance with an embodiment of the present invention a method, including automatically identifying, by a processor, a region of a digital image containing first pixels, each situated on a positive horizontal gradient, and second pixels in proximity to the first pixels, each situated on a negative horizontal gradient, calculating a distribution of intensities of a color channel for the pixels in the region, and analyzing the distribution in order to detect whether the region contains anti-aliased text.

There is also provided, in accordance with an embodiment of the present invention an apparatus, including a memory storing a digital image, and a processor configured to automatically identify a region of the digital image containing first pixels, each situated on a positive horizontal gradient, and second pixels in proximity to the first pixels, each situated on a negative horizontal gradient, to calculate a distribution of intensities of a color channel for the pixels in the region, and to analyze the distribution in order to detect whether the region contains anti-aliased text.

There is further provided, in accordance with an embodiment of the present invention a computer program product, the computer program product including a non-transitory computer readable storage medium having computer readable program code embodied therewith, the computer readable program code including computer readable program code configured to automatically identify a region of a digital image containing first pixels, each situated on a positive horizontal gradient, and second pixels in proximity to the first pixels, each situated on a negative horizontal gradient, computer readable program code configured to calculate a distribution of intensities of a color channel for the pixels in the region, and computer readable program code configured to analyze the distribution in order to detect whether the region contains anti-aliased text.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

To convert an aliased text image (i.e., an image containing aliased text) to an anti-aliased text image (i.e., an image containing anti-aliased text), a horizontal low-pass filtration of the aliased image is typically performed. The horizontal low-pass filtration produces gradients on both sides of each character in the anti-aliased image.

Anti-aliasing influences a histogram presenting a distribution of intensities of a color channel for pixels of the aliased image. For example, in instances where text and background colors in the aliased image are uniform, the histogram typically comprises two nonzero bins, with one bin corresponding to the text and the other bin corresponding to the background color. As a result of gradients introduced by anti-aliasing, anti-aliasing filtration may add a few more nonzero bins between the bins of the text and background colors, resulting in a comb shaped histogram.

Embodiments of the present invention provide methods and systems for identifying regions containing anti-aliased text (i.e., words) within a digital image. In some embodiments, regions of horizontal gradient are first identified, and for each identified region, intensity distributions (i.e., histograms) of separate color channels (e.g., red, green and blue) are calculated. If at least one of the color channel intensity distributions for a given identified region corresponds to anti-aliased text image distribution properties, and the other channels are degenerate, then anti-aliased text is indicated in the given identified region. In embodiments of the present invention, a degenerate color channel comprises a given color channel whose distribution includes either a single intensity, or one narrow range of intensities.

In operation, identified regions containing anti-aliased text can be conveyed to an optical character recognition (OCR) application configured to extract text from the identified regions. The extracted text can then be conveyed to additional applications, such as a language translation application.

System Description

Figure 1:
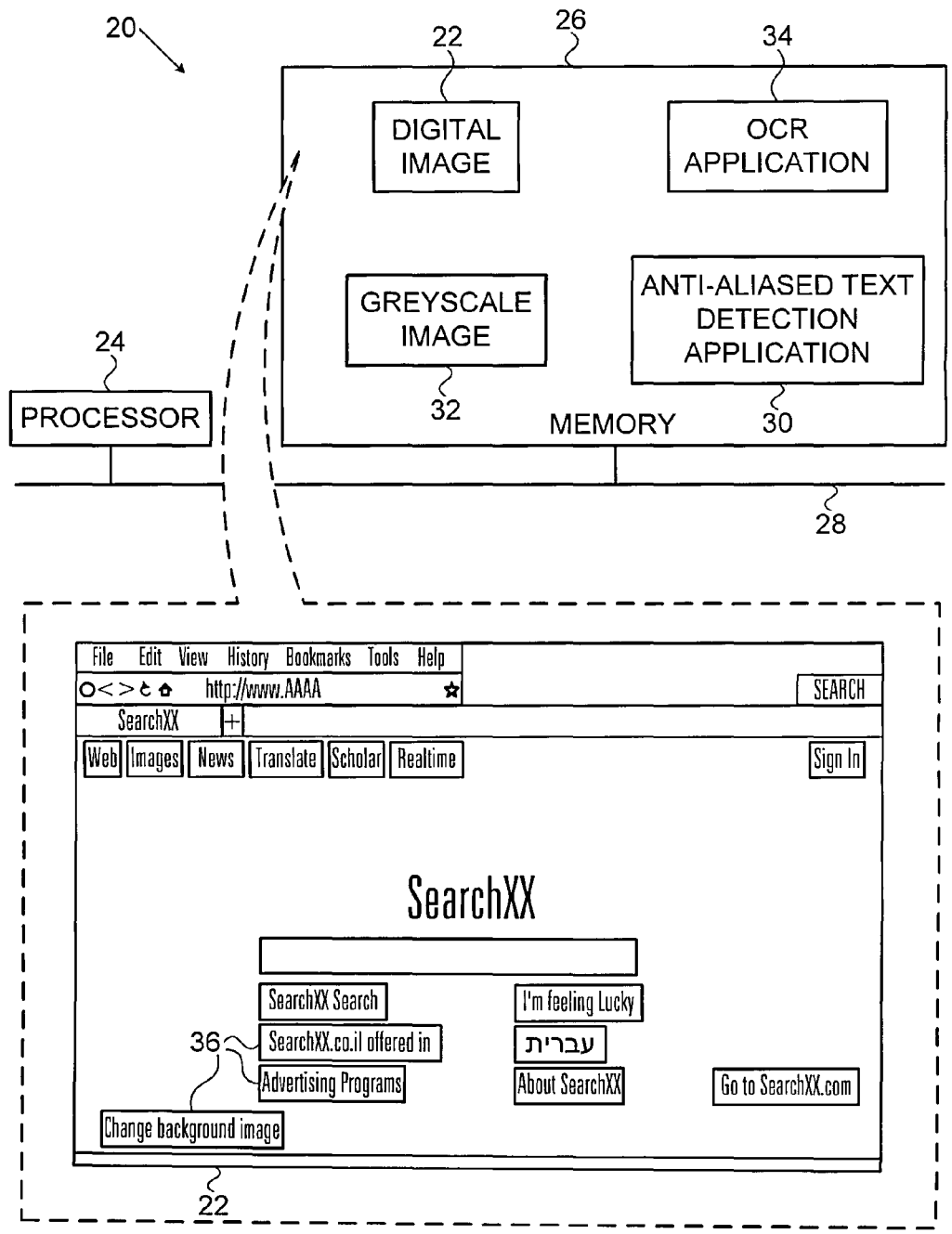
FIG. 1 is a schematic pictorial illustration of a system configured to identify one or more regions containing anti-aliased text within a digital image, in accordance with an embodiment of the present invention.

FIG. 1 is a schematic pictorial illustration of a system 20 configured to detect anti-aliased text within a digital image 22 (in this case a screen image), in accordance with an embodiment of the present invention. System 20 comprises a processor 24 coupled to a memory 26 via a bus 28. In operation, processor 24 executes an anti-aliased text detection application 30 that is configured to transform digital image 22 to a grayscale image 32, and to identify regions 36 containing anti-aliased text. In the description herein, regions 36 may be differentiated by appending a letter to the identifying numeral, so that for example, regions 36 may comprise a region 36A, a region 36B, . . . . In some embodiments processor 24 may convey regions 36 to an optical character recognition (OCR) application 34 configured to translate the detected regions into machine-encoded text.

Processor 24 typically comprises a general-purpose computer configured to carry out the functions described herein. Software operated by the processor may be downloaded to the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Anti-Aliased Text Detection

Figure 2:
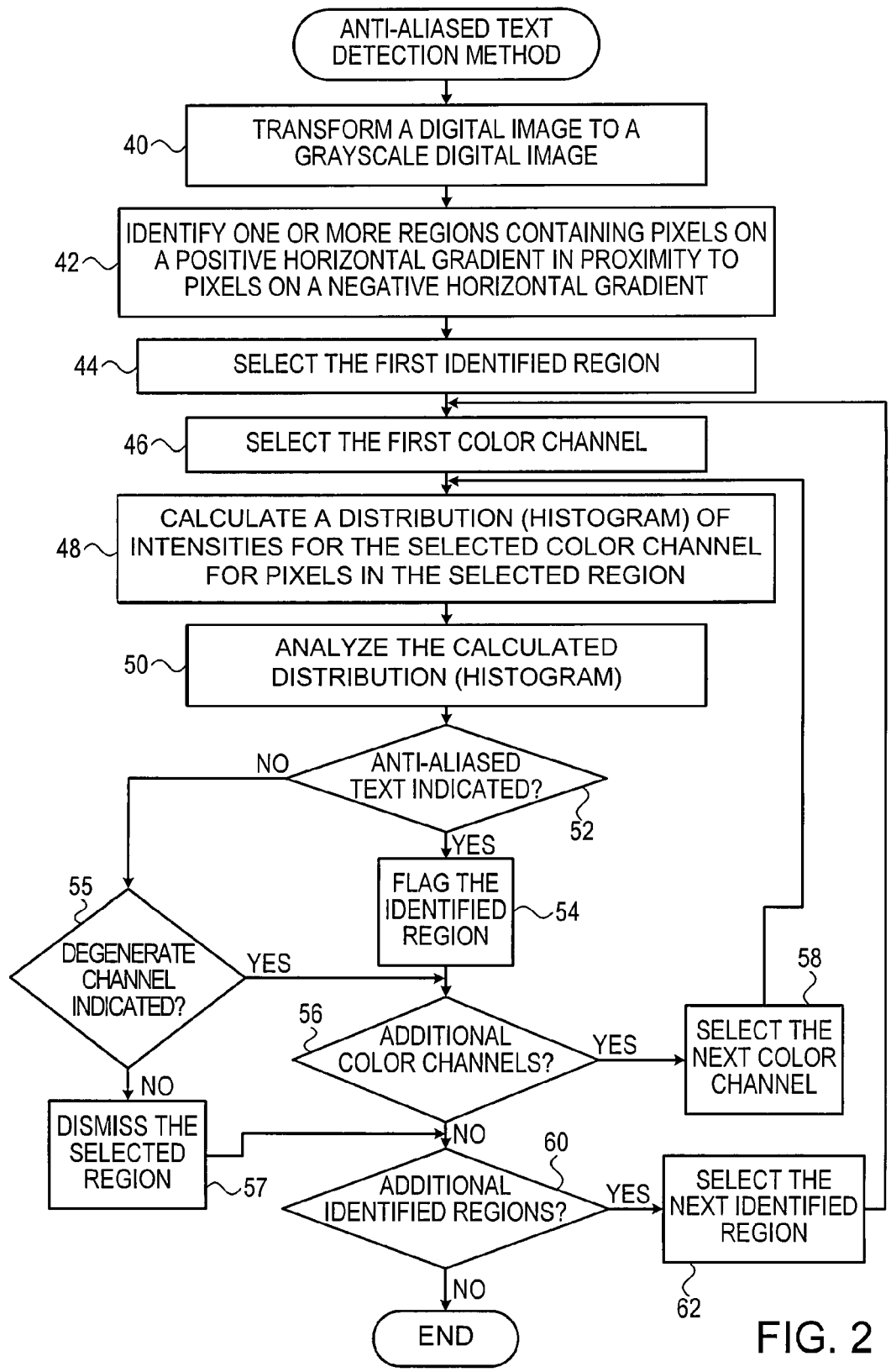
FIG. 2 is a flow diagram that schematically illustrates a method of detecting the one or more regions containing anti-aliased text within the digital image, in accordance with an embodiment of the present invention.
Figure 3A:
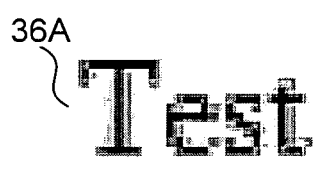
FIG. 3A is a first example of a region containing anti-aliased text, in accordance with an embodiment of the present invention.
Figure 3B:
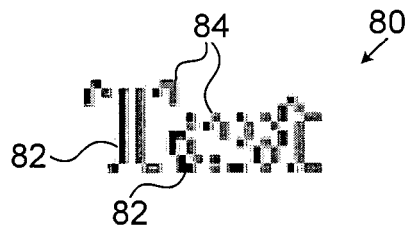
FIG. 3B is graphical representation of positive horizontal gradients and negative horizontal gradients in the first example region, in accordance with an embodiment of the present invention.

FIG. 2 is a flow diagram that schematically illustrates a method of detecting anti-aliased text in digital image 22, in accordance with an embodiment of the present invention. FIG. 3A is a first example region 36A containing anti-aliased text, and FIG. 3B is graphical representation of positive horizontal gradients and negative horizontal gradients in the first example region, in accordance with an embodiment of the present invention.

Figure 4A:
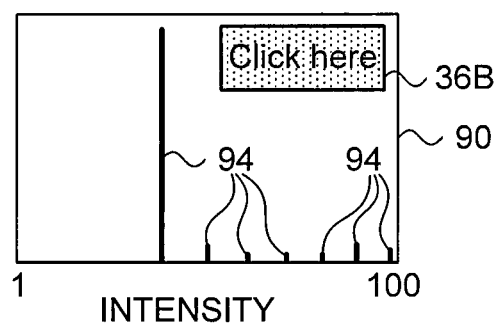
FIG. 4A is a histogram presenting a distribution of intensities of a color channel for pixels in a second example region containing anti-aliased text, in accordance with an embodiment of the present invention.
Figure 4B:
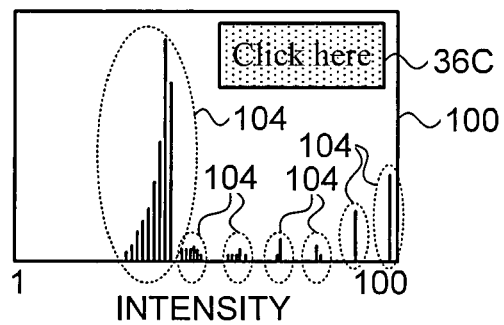
FIG. 4B is a histogram presenting a distribution of intensities of a color channel for pixels in a third example region containing anti-aliased text, in accordance with an embodiment of the present invention.

FIG. 4A is a histogram 90 presenting a distribution of intensities of a color channel for pixels in a second example region 36B containing anti-aliased text, in accordance with an embodiment of the present invention, and FIG. 4B is a histogram 100 presenting a distribution of intensities of a color channel for pixels in a third example region 36C containing anti-aliased text, in accordance with an embodiment of the present invention.

In an initialization step 40 in the flow diagram, processor 24 transforms digital image 22 (e.g., a screen image) into grayscale image 32 using digital image processing techniques known in the art. In a horizontal gradient identification step 42, processor 24 automatically scans the image horizontally and identifies one or more regions 36 within grayscale image 32 that contain first pixels situated on a positive horizontal gradient in proximity to second pixels situated on a negative horizontal gradient. A pixel on a positive horizontal gradient comprises a pixel that is lighter than a left neighboring pixel by a specified threshold (i.e., a number of levels of gray) and darker than a right neighboring pixel by the specified threshold. A pixel on a negative horizontal gradient comprises a pixel that is darker than a left neighboring pixel by the specified threshold and lighter than a right neighboring pixel by the specified threshold.

To identify regions in the grayscale image that contain pixels on a positive horizontal gradient in proximity to pixels on a negative horizontal gradient, processor 24 first calculates a positive horizontal gradient indicator $D_p$ and a negative horizontal gradient indicator $D_n$. $D_p$ comprises a set of binary values, where each of the binary values indicates whether or not a corresponding pixel in grayscale image 32 resides on a positive horizontal gradient. Likewise, $D_n$ comprises a set of binary values, where each of the binary values indicates whether or not a corresponding pixel in grayscale image 32 resides on a negative horizontal gradient. $D_p$ and $D_n$ are calculated as follows:

$$D_{p_{i,j}} = \begin{cases} 1, & I_{i,j-1} + \Delta < I_{i,j} < I_{i,j+1} - \Delta \\ 0, & \text{otherwise} \end{cases} \quad (1)$$

$$D_{n_{i,j}} = \begin{cases} 1, & I_{i,j-1} - \Delta > I_{i,j} > I_{i,j+1} + \Delta \\ 0, & \text{otherwise} \end{cases} \quad (2)$$

where i and j comprise row and column coordinates for a given pixel in grayscale image 32, and Δ comprises a threshold (e.g., five gray levels) for a difference in intensity between neighboring pixels. Therefore, if the pixel in grayscale image 32 corresponding to $D_{p_{i,j}}$ is lighter than the left neighboring pixel by at least Δ, and darker then the right neighboring pixel by at least Δ, then $D_{p_{i,j}}=1$, otherwise $D_{p_{i,j}}=0$. Likewise, if the pixel in grayscale image 32 corresponding to $D_{n_{i,j}}$ is darker than the left neighboring pixel by at least Δ, and lighter then the right neighboring pixel by at least Δ, then $D_{n_{i,j}}=1$, otherwise $D_{n_{i,j}}=0$.

After calculating $D_p$ and $D_n$, processor 24 defines a general horizontal gradient indicator set D as a union of sets $D_p$ and $D_n$ (i.e., $D=D_p \cup D_n$). Therefore, set D identifies all pixels in grayscale image 32 that reside on either a positive horizontal gradient or a negative horizontal gradient.

Processor 24 then identifies regions 36 in digital image 22 that (a) are within a specified pixel threshold (i.e., a number of pixels), and (b) have pixels $D_p$ which are in proximity (e.g., within two pixels) to $D_n$. In some embodiments the pixel threshold may comprise a minimum number of total pixels in a given region 36. In an alternative embodiment, the pixel threshold may comprise a height-of-character threshold (e.g., between 6 and 50 pixels) of the given region. Processor 24 can set the height-of-character threshold based on font (i.e., character) sizes expected in digital image 22.

FIG. 3A shows first example region 36 containing anti-aliased text "Test", and FIG. 3B comprises a grayscale image 80 representing D, where each pixel in the first example region has a corresponding pixel in grayscale image 80. A gray pixel in grayscale image 80 indicates a corresponding pixel in first example region 36 positioned on a positive horizontal gradient (i.e., $D_p$), and a black pixel 82 in the bitmap indicates a corresponding pixel in the first example region positioned on a negative horizontal gradient (i.e., $D_n$).

Returning to the flow diagram, in a first region selection step 44, processor 24 selects a first identified region 36, and in a first color channel selection step 46, the processor selects a first color channel. Examples the color channels used by system 20 are red, green and blue. In a calculation step 48, processor 24 calculates a distribution of intensities for the selected color channel for pixels in the selected region.

In an analysis step 50, processor 24 analyzes the calculated distribution to determine whether the distribution indicates that selected region 36 contains anti-aliased text. If the following criteria are met, then the distribution indicates that selected region 36 contains anti-aliased text:

Pixels in the distribution are distributed into a specific number of groups. For example, processor 24 can set a range threshold of between five and ten groups.

Each group includes a number of intensities within a specified range (e.g., between 1-30 gray levels).

The group containing the most pixels is either the group having the lowest intensity or the group having the highest intensity.

In some embodiments, analyzing the distribution may comprise processor 24 creating a histogram for the distribution, where the histogram plots the distribution along a vertical Y-axis having a range of pixels (e.g., 1-1000) and a horizontal X-axis having a range of intensities (e.g., 1-256) for a given color channel. Processor 24 then identifies a number of bins (corresponding to groups in the criteria above) in the histogram, identifies a number of intensities in each of the bins, and identifies a given intensity associated with the bin containing a highest number of pixels. Applying the criteria described supra, anti-aliased text in selected region 36 may be indicated if there are seven bins of pixels, the number of intensities (i.e., the length in the X-axis) in each of the bins is less than 30, and the bin with the most pixels (i.e., with the highest Y-axis value) is either the bin having the lowest intensity or the bin having the highest intensity.

Histogram 90 of FIG. 4A shows a distribution of red channel intensities for a second example region 36 containing the text "Click Here" on a uniform background. Since second example region 36 comprises a uniform background, non-zero bins 94 are isolated, in other words, each bin 94 has a single intensity. Histogram 90 indicates that second example region 36 contains anti-aliased text, since (a) all pixels from the second example region are grouped within seven bins 94, (b) the number of intensities in each bin 94 is less than 30, and (c) a given bin with the greatest number of pixels comprises the bin associated with pixels with the lowest intensity.

Histogram 100 of FIG. 4B is a distribution of red channel intensities for a third example region 36 containing the text "Click Here" on an approximately uniform background. Since third example region 36 comprises a non-uniform background, non-zero bins 104 are not single intensities, in other words, each bin 104 includes multiple intensities. Histogram 100 indicates that third example region 36 contains anti-aliased text, since (a) all pixels from the third example region are grouped within seven bins 104, (b) the number of intensities in each bin 104 is less than 30, and (c) a given bin 104 with the greatest number of pixels comprises the bin associated with pixels with the lowest intensity.

In a first comparison step 52, if the analysis of the calculated distribution indicates that there is anti-aliased text in selected region 36, then in a flag step 54, processor 24 flags the selected region as containing anti-aliased text. In a second comparison step 56, if there are additional color channels, then processor 58 selects a subsequent color channel in a second color channel selection step 58, and the method continues with step 48. However, if there are no additional color channels, then in a third comparison step 60, if there are additional identified regions 36, then processor 24 selects a subsequent identified region in a second region selection step 62, and the method continues with step 46. If there are no additional identified regions 36, then the method ends.

Returning to step 52, if the analysis of the calculated distribution does not indicate that there is anti-aliased text in selected region 36, then in a fourth comparison step 55, if the analysis of the calculated distribution indicates a degenerate color channel (i.e., the calculated distribution includes either a single intensity, or a narrow range of intensities), then the method continues to step 56.

Returning to step 55, if the analysis of the calculated distribution does not indicate a degenerate color channel, then processor 24 dismisses the selected region in a dismissal step 57, and the method continues with step 60. Dismissing the selected region comprises removing (i.e., cancelling) the flag indicating that the selected region contains anti-aliased text. However, if the selected region was not flagged, dismissing the region does not change the selected region's status. Upon completing the method described in the flow diagram, processor 24 may convey coordinates of the flagged regions to OCR application 34, which translates the detected regions into machine-encoded text.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    automatically identifying, by a processor, a region of a digital image containing first pixels, each situated on a positive horizontal gradient, and second pixels in proximity to the first pixels, each situated on a negative horizontal gradient;
    calculating a distribution of intensities of a color channel for the pixels in the region;
    analyzing the distribution in order to detect whether the region contains anti-aliased text;
    wherein analyzing the distribution comprises creating a histogram presenting a distribution of intensities of the color channel for pixels in the region, identifying a number of bins in the histogram, identifying a number of intensities in each bin, and identifying an intensity associated with a bin containing a highest number of pixels; and
    wherein the region contains anti-aliased text upon detecting that the identified number of bins and the identified number of intensities in each bin are within specified ranges, and the bin containing the highest number of pixels comprises the bin having either highest or lowest intensity.

2. The method according to claim 1, and comprising transforming the digital image to a grayscale image prior to identifying the first pixels and the second pixels.

3. The method according to claim 2, wherein each of the first pixels is lighter than a left neighboring pixel by a specified threshold and darker than a right neighboring pixel by the specified threshold, and wherein each of the second pixels is darker than a left neighboring pixel by the specified threshold and lighter than a right neighboring pixel by the specified threshold.

4. The method according to claim 1, wherein the color channel is selected from a list consisting of a red channel, a blue channel and a green channel.

5. The method according to claim 1, and comprising conveying coordinates of the region to an optical character recognition application upon detecting that the region contains anti-aliased text.

6. An apparatus, comprising:
    a memory storing a digital image; and
    a processor configured to automatically identify a region of the digital image containing first pixels, each situated on a positive horizontal gradient, and second pixels in proximity to the first pixels, each situated on a negative horizontal gradient, to calculate a distribution of intensities of a color channel for the pixels in the region, and to analyze the distribution in order to detect whether the region contains anti-aliased text;
    wherein the processor is configured to analyze the distribution by creating a histogram presenting a distribution of intensities of the color channel for pixels in the region, identifying a number of bins in the histogram, identifying a number of intensities in each bin, and identifying an intensity associated with a bin containing a highest number of pixels; and
    wherein the region contains anti-aliased text upon the processor detecting that the identified number of bins and the identified number of intensities in each bin are within specified ranges, and the bin containing the highest number of pixels comprises the bin having either highest or lowest intensity.

7. The apparatus according to claim 6, wherein the processor is configured to transform the digital image to a grayscale image prior to identifying the first pixels and the second pixels.

8. The apparatus according to claim 7, wherein each of the first pixels is lighter than a left neighboring pixel by a specified threshold and darker than a right neighboring pixel by the specified threshold, and wherein each of the second pixels is darker than a left neighboring pixel by the specified threshold and lighter than a right neighboring pixel by the specified threshold.

9. The apparatus according to claim 6, wherein the processor is configured to select the color channel from a list consisting of a red channel, a blue channel and a green channel.

10. The apparatus according to claim 6, wherein the processor is configured to convey coordinates of the region to an optical character recognition application upon detecting that the region contains anti-aliased text.

11. A computer program product, the computer program product comprising:
   a non-transitory computer readable storage medium having computer readable program code embodied therewith, the computer readable program code comprising:
   computer readable program code configured to automatically identify a region of a digital image containing first pixels, each situated on a positive horizontal gradient, and second pixels in proximity to the first pixels, each situated on a negative horizontal gradient;
   computer readable program code configured to calculate a distribution of intensities of a color channel for the pixels in the region; and
   computer readable program code configured to analyze the distribution in order to detect whether the region contains anti-aliased text;
   wherein the computer readable program code is configured to analyze the distribution by creating a histogram presenting a distribution of intensities of the color channel for pixels in the region, identifying a number of bins in the histogram, identifying a number of intensities in each bin, and identifying an intensity associated with a bin containing a highest number of pixels; and
   wherein the region contains anti-aliased text upon the computer readable program code detecting that the identified number of bins and the identified number of intensities in each bin are within specified ranges, and the bin containing the highest number of pixels comprises the bin having either highest or lowest intensity.

12. The computer program product according to claim 11, and comprising computer readable program code configured to transform the digital image to a grayscale image prior to identifying the first pixels and the second pixels.

13. The computer program product according to claim 12, wherein each of the first pixels is lighter than a left neighboring pixel by a specified threshold and darker than a right neighboring pixel by the specified threshold, and wherein each of the second pixels is darker than a left neighboring pixel by the specified threshold and lighter than a right neighboring pixel by the specified threshold.

14. The computer program product according to claim 11, wherein the computer readable program code is configured to select the color channel from a list consisting of a red channel, a blue channel and a green channel.

15. The computer program product according to claim 11, and comprising computer readable program code configured to convey coordinates of the region to an optical character recognition application upon detecting that the region contains anti-aliased text.

\* \* \* \* \*